May 19, 1953  F. R. SCHMITT  2,639,025

NONCREEPING METALLIC BELT

Filed May 22, 1947  2 Sheets-Sheet 1

INVENTOR
FRANK R. SCHMITT
BY
Charles A. Morton
ATTORNEY

May 19, 1953  F. R. SCHMITT  2,639,025
NONCREEPING METALLIC BELT
Filed May 22, 1947  2 Sheets-Sheet 2
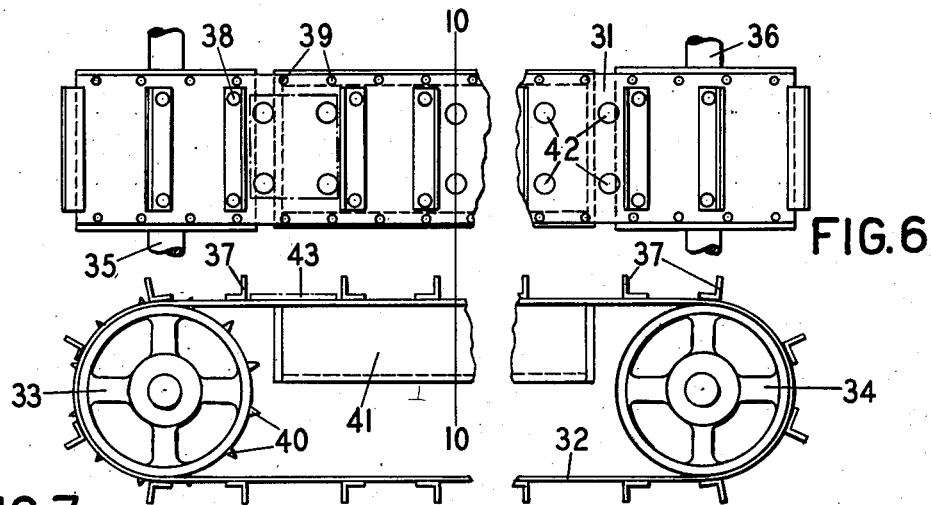
FIG.6
FIG.7
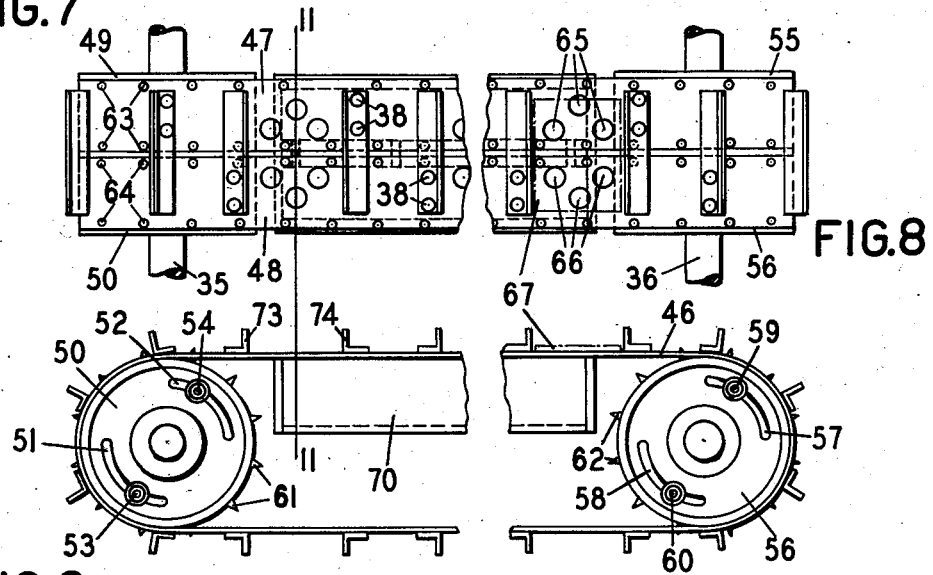
FIG.8
FIG.9
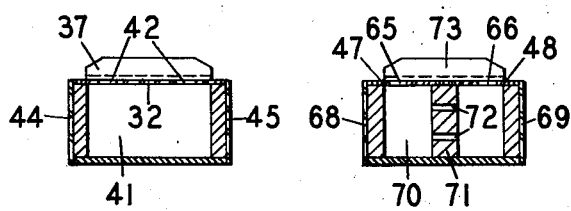
FIG.10  FIG.11
INVENTOR
FRANK R. SCHMITT
BY 
ATTORNEY Patented May 19, 1953

2,639,025

UNITED STATES PATENT OFFICE 2,639,025

NONCREEPING METALLIC BELT

Frank R. Schmitt, Queens Village, N. Y.

Application May 22, 1947, Serial No. 749,681

7 Claims. (Cl. 198—184)

This invention relates to improvements in non-creeping metallic belts and more particularly a non-creeping metallic belt of the flexible type. It is particularly adapted for use in a belt conveyor system and especially in those conveyor systems where adjustable conveyor pockets are required.

Belt conveyors having intermittent or continuous travel have long been in operation throughout industry in applications where the relationship of the belt travel to the driving member has not been a critical factor. This condition permits the slippage that occurs in all friction driven conveyors to be ignored.

In automatic and semi-automatic machinery, where the position of an object at any instant of the machine's cycle is of prime importance, mechanically positive drives are utilized, usually sprocket and chain combinations. This usually results in the article being pushed along a surface by the sprocket and chain combination or carried on a complicated surface mounted to the chain. These and other similar methods are costly and of heavy construction in comparison to a conveyor belt but they do provide the positive action so essential in automatic and semi-automatic processing machinery.

One object of this invention is a non-creeping metallic belt.

Another object is a non-creeping flexible metallic belt.

Another object is a non-creeping flexible metallic belt conveyor having adjustable pockets.

Another object is a non-creeping flexible metallic duplex belt.

Another object is a non-creeping flexible metallic duplexed belt conveyor having pockets which may be adjusted within the range of the machine to accommodate articles of various sizes.

Other objects will appear from the detailed description which follows.

The invention herein described successfully combines the light weight and economical cost of the conveyor belt with the locating characteristics of positive mechanical mechanisms. It has the additional feature of being as fully adjustable as is necessary for the range of the mechanism or machine, which adjustment is made very simply as hereinafter described.

In the drawings comprising two sheets of eleven figures numbered Figs. 1 to 11, inclusive:

Fig. 6 is a plan view, partially broken away, of my non-creeping belt as applied to another form of conveyor system;

Fig. 7 is a side elevational view of the system of Fig. 6, partially broken away;

Fig. 8 is a plan view of a duplex belt, partially broken away, as applied to a conveyor system;

Fig. 9 is a side elevational view, partially broken away, of the device of Fig. 8;

Fig. 10 is a vertical cross-sectional view of the device of Fig. 6, taken along the line 10—10 of Fig. 6; and Fig. 11 is a vertical cross-sectional view of the device of Fig. 8, taken along the line 11—11 of Fig. 8.

Like reference characters designate corresponding parts throughout the several figures of the drawings.

Figure 1:
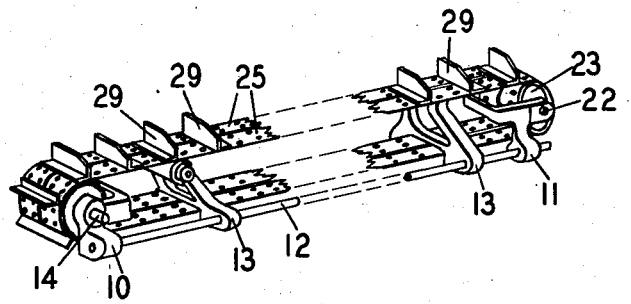
Fig. 1 is a modified perspective view of my non-creeping belt as applied to a conveyor system.

One of the structures selected for illustration, comprises a pair of suitable shaft bearing end brackets 10 and 11 which are maintained in spaced relation on dual horizontal tie rods 12 by suitable fasteners such as set screws. Spaced at intervals along the dual horizontal tie rods 12 are suitable supporting members 13, in number as necessary for the length of the mechanism.

Mounted in the shaft bearing end bracket 10 is the driving shaft 14 which is powered by a suitable external means such as an electrical motor (not shown). Mounted on the driving shaft 14 is the driving disc 15 which is driven by the shaft 14 through the key 16. Also mounted on the shaft 14 are the twin driving drums 17 and 18 which are clamped to the driving disc 15 by the bolts 19 which pass through the slots 20—20 (see Fig. 4). The slots 20—20 permit the relative rotation of the drums 17 and 18 upon the shaft 14 (Fig. 3), to vary the relationship between the drums 17 and 18 as desired. The drums 17 and 18 have registering pins 21 properly spaced on their periphery. Mounted in the shaft bearing end bracket 11 is the fixed shaft 22 on which rotate the belt idler drums 23.

The registering pins 21 engage properly spaced holes 24 which are punched in dual thin metal belts 25 of the type used commercially for conveying systems.

Each thin metal belt 25 is made endless commercially by brazing, welding or other types of permanent jointing. For the purpose of this description it is assumed that the belt 25 is made endless, by the use of the complementary hinge members 26 and 27 and the hinge pin 28 (see Fig. 5).

Alternate conveyor pocket locating members 29 are fastened to one or the other of the thin metal belts 25 by any suitable means such as the rivets 30. The members 29 are spaced at any desired interval, and are offset to overlap the adjacent metal belt 25.

Figure 5:
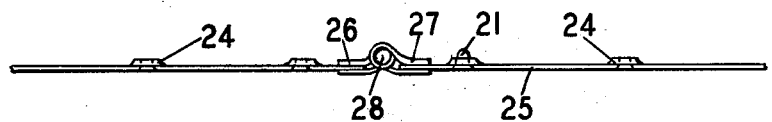
Fig. 5 is a fragmentary elevational view of the conveyor belt.

The registering holes 24 that are punched in the metal belt 25 are flanged as shown in Fig. 5 to increase the bearing area in contact with the registering pin 21, thereby decreasing wear and providing smoother engagement and disengagement with the registering pin 21.

In the modified form shown in Figs. 6, 7 and 10, the non-creeping endless metallic belt 31 is developed by suitably jointing the ends of the flexible metallic ribbon 32. The belt 31 is driven by the driving drum 33 which is keyed to a driving shaft 35, powered in any suitable manner, as by an electric motor (not shown). The idler drum 34 is rotatably supported in any suitable manner as upon a fixed shaft 36. At suitably spaced intervals the positioning and confining cleats 37 are attached to the belt 31 in any preferred manner as by brazing or by rivetting as at 38 (Fig. 6). To prevent creeping flanged holes 39 are formed, as by punching, at suitably spaced intervals along the marginal edges of the ribbon 32, and registering pins 40 are anchored at similarly spaced intervals around the circumferential marginal edge of the driving drum 33 to engage in the flanged holes 39 thus preventing the belt 31 from creeping.

The endless belt 31 which passes over a vacuum box 41, is provided with suction holes 42—42 which cooperate with the vacuum box to retain a sheet of flimsy material 43, supported in the conveyor pocket formed by a pair of spaced cleats 37, in fixed position, thus preventing the flimsy material 43 from creeping or being otherwise displaced, as the belt 31 carrying the sheet of flimsy material 43 advances, to bring said flimsy sheet 43 into position for further manipulation as for example into a wrapper for soft goods such as a handkerchief or the like.

The vacuum box 41 is elongated to conform to the travelling belt 31, and is provided with suitable means for supporting the running edges of the upper flight of the belt 31. Said supporting means may be furnished by constructing the side walls 44 and 45 of the vacuum box 41 (Fig. 7) of suitable thickness to properly support the belt 31, or said side walls 44 and 45 may be provided with laterally projecting flanges or the like defining supporting shelves for the oppositely disposed running edges of the flexible ribbon 32.

Figure 2:
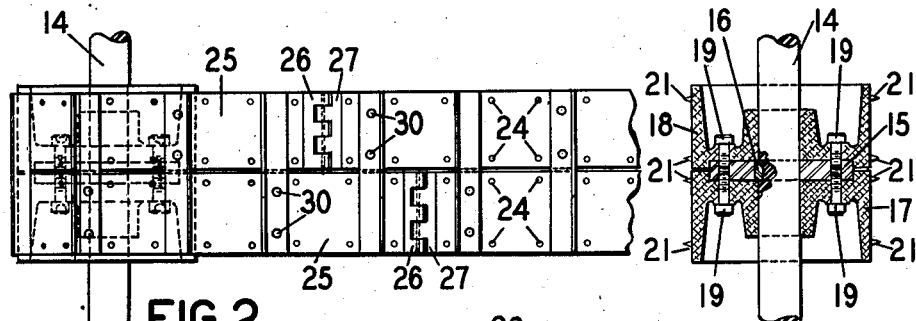
Fig. 2 is a fragmentary plan view of the driving and registering end of the belt conveyor.

In the modified form shown in Figs. 7, 8 and 11, a dual non-creeping (adjustable) metallic belt 46 similar to the dual belt 25—25 (Figs. 1 and 2), is combined with a twin compartmented vacuum box 70, to produce an adjustable non-creeping belt conveyor capable of handling sheets of flimsy material 67 (Fig. 9), similar to the flimsy material 43 (Fig. 7), in the process of subjecting the said sheets 67 to mechanical manipulation as by a wrapping machine or the like.

Figure 3:
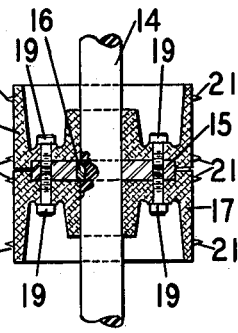
Fig. 3 is a fragmentary sectional plan view of the driving and registering drum of the conveyor system.
Figure 4:
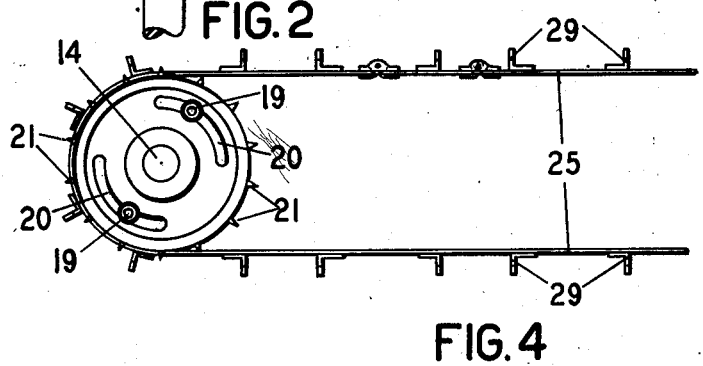
Fig. 4 is a fragmentary elevational view of the belt conveyor of Fig. 2.

In this construction, dual flexible metallic ribbons 47 and 48 are suitably separately joined to form endless belts 46—46, which are driven by the dual driving drums 49 and 50 which are clamped to a driving disc keyed to the driving shaft 35 in the manner described generally with reference to Fig. 3. The adjustment slots 51 and 52 accommodate the locking bolts 53 and 54. Similarly, the idler drums 55 and 56 may be clamped to a disc rotatably supported as by the fixed shaft 36, by means of the locking bolts 59 and 60 carried in the adjustment slots 57 and 58. Thus by loosening the bolts 53, 54 and 59, 60, the driving drums 49, 50 and the idler drums 55, 56 may be similarly relatively rotated to vary the relationship between the drums 49, 50 and 55, 56 as desired to correspondingly adjust the dual endless belts and vary the spacing between the various pairs of positioning and confining cleats 73, 74 to adjust the size of the pockets between them within the pre-selected limits. The cleats 73, 74 may be brazed or otherwise anchored at 38, 38 to the dual endless belts 46—46.

The spaced registering pins 61, 62 associated with the drums 49, 50 and 55, 56 cooperate with the similarly spaced flanged holes 63, 64 punched or otherwise formed along the running edges of the flexible ribbons 47, 48 to prevent any relative creeping of the dual endless belts.

A vacuum box 70 subdivided into two elongated compartments by a partition wall 71 cooperates with the suction holes 65 and 66 to retain sheets of flimsy material 67 (Fig. 9) in proper position between the pairs of relatively adjustable positioning and confining cleats 73 and 74.

The partition wall 71 may be provided with a number of passages 72 to interconnect the compartments of the vacuum box 70, and the side walls 68 and 69 of the vacuum box 70 provide the necessary support for the running edges of the endless belts 46—46.

The suction holes 65 and 66 may be introduced into the endless belts 46—46, to form any predetermined pattern, dependent upon the size of the sheet of wrapping material 67. The suction holes may be grouped so that when the confining cleats 73 and 74 are moved towards each other the suction holes 65 and 66 are not exposed but are sealed by one or the other of the lateral flanges of the cleats 73 and 74.

The vacuum boxes 41 and 70 are pneumatically connected to a vacuum pump or to the intake side of a compressor (not shown), so as to reduce the pressure in either of said vacuum boxes below atmospheric pressure.

What is claimed is:

1. A duplex belt-conveyor system comprising a plurality of flexible sheet metal sections, the ends of each of said sections being connected together independently, flights secured to said sections crosswise to form pockets, alternate flights being secured to the same section of said belt, means for driving both sections of said belt in unison by friction applied thereto, and means for insuring positive registration of said flights comprising a series of equally spaced holes formed in each running edge of each section of the belt and pins rotatably operable to register with said holes.

2. A flexible metallic belt, flights adjustably mounted thereon said belt having distinctively grouped holes formed therein between said flights, said flights being movable relative to said belt to cover and uncover said holes, and a vacuum box positioned beneath the belt for cooperating with successive groups of holes to reduce the pressure beneath successive groups of holes below atmospheric pressure.

3. A conveyor system comprising a vacuum box open at one end, a flexible metallic duplex belt-conveyor comprising relatively movable sections, mounted to move across and seal off the open end of said vacuum box, flights extending across said belt-conveyor and secured to one of said movable sections, the other section of said belt-conveyor having a series of groups of air-holes formed therein at spaced intervals, said sections being relatively movable to cause said flights to cover some of the grouped air holes in each group and to uncover the others, and said vacuum box being effective to reduce the pressure beneath successive groups of holes in said moving belt-conveyor below atmospheric pressure.

4. A conveyor system comprising a vacuum box open at the upper end, said vacuum box being sub-divided into separate compartments, each of said compartments being adapted to be maintained at a pressure below atmospheric, a flexible metallic duplex belt comprising two interdependent sections, said belt being mounted to move across and seal the mouth of said vacuum box, flights secured to said sections to form conveyor pockets, alternate flights being separately secured to the same section of said duplex belt, said adjacent sections of said belt being relatively movable to vary the size of said pockets, each section of said belt having groups of holes formed therein at spaced intervals between flights, said holes being arranged in accordance with a predetermined pattern so that relative movement of the flights seals off the holes which are thereby rendered ineffective, and said vacuum box compartments being separately operable to reduce the pressure beneath successive groups of holes in one or the other of said sections of belt below atmospheric pressure.

5. In a conveyor system and in combination a duplex belt conveyor comprising separate, detached and independent sections of equal length, each section consisting of a single ply of a flexible metallic ribbon having its opposite ends independently hingedly interconnected and having oppositely disposed equally spaced pulley-pin-receiving-holes formed along its running edges a duplex pulley for driving said duplex belt by frictional engagement therewith, said pulley being subdivided into two relatively rotatable sections, said sections when relatively rotated imparting relative movement to said separate sections of said belt, pins mounted upon the peripheral edges of each section of said duplex pulley, said holes being operable to effect positive registration with said pins to eliminate relative creeping of either section of the duplex belt relative to the other, or to said duplex pulley.

6. A friction driven flexible metallic duplex belt conveyor, comprising separate and distinct conveyor sections arranged to advance side by side in unison, each section consisting of a single relatively thin ply of flexible sheet metal, groups of holes passing through the body of each conveyor section at predetermined intervals to form air-holes defining a preselected repeat pattern, a series of pairs of flights extending across said belt conveyor, one flight of each pair being secured to one of said conveyor sections between groups of air-holes and the other flight of said pair being secured to said other conveyor section between groups of air-holes, and said adjacent conveyor sections being relatively movable to vary the spacing between the paired-flights thereby moving some of the air-holes in each group beneath the flights to seal said air-holes against passage of air therethrough.

7. A friction driven flexible metallic duplex belt conveyor, comprising separate and distinct conveyor sections arranged to advance side by side in unison, each section consisting of a single relatively thin ply of flexible sheet metal, groups of holes passing through the body of each conveyor section at predetermined intervals to form air-holes defining a preselected repeat pattern, a series of pairs of flights extending across said belt conveyor, one flight of each pair being secured to one of said conveyor sections between groups of air-holes and the other flight of said pair being secured to said other conveyor section between groups of air-holes, a pulley for frictionally driving said adjacent conveyor sections to advance them in unison side by side, said adjacent conveyor sections being relatively movable upon said pulley to vary the spacing between the paired-flights thereby moving some of the air-holes in each group beneath the flights to seal said air-holes against passage of air therethrough, and means for insuring positive registration of said paired-flights and for eliminating relative creeping of said conveyor sections and of said duplex belt relative to said pulley comprising a series of equally spaced pin-engaging holes formed in the running edges of both conveyor sections and pins mounted upon said pulley and rotatable therewith to register in said holes.

FRANK R. SCHMITT.

References Cited in the file of this patent

UNITED STATES PATENTS

| Number | Name | Date |
| --- | --- | --- |
| 1,278,537 | Wegner | Sept. 10, 1918 |
| 1,321,686 | Varden | Nov. 11, 1919 |
| 1,627,354 | Thorsten | May 3, 1927 |
| 1,847,148 | Vogeley | Mar. 1, 1932 |
| 1,849,205 | Rypinski | Mar. 15, 1932 |
| 2,126,240 | Bergh | Aug. 9, 1938 |
| 2,358,292 | Malhiot | Sept. 12, 1944 |
| 2,362,168 | Stokes | Nov. 7, 1944 |